Dec. 8, 1959 J. S. PILCH Re. 24,746

MATERIAL HANDLING DEVICE

Original Filed Jan. 24, 1955 3 Sheets-Sheet 1

INVENTOR.
JOHN S. PILCH
BY Raymond A. Paquin
ATTORNEY.

MATERIAL HANDLING DEVICE

Original Filed Jan. 24, 1955 3 Sheets-Sheet 2

INVENTOR.
JOHN S. PILCH
BY
Raymond A. Paquin
ATTORNEY.

MATERIAL HANDLING DEVICE

Original Filed Jan. 24, 1955 3 Sheets-Sheet 3

INVENTOR.
JOHN S. PILCH
BY
Raymond A. Paquin
ATTORNEY.

United States Patent Office

Re. 24,746
Reissued Dec. 8, 1959

24,746

MATERIAL HANDLING DEVICE

John S. Pilch, Ware, Mass.

Original No. 2,817,448, dated December 24, 1957, Serial No. 483,689, January 24, 1955. Application for reissue June 30, 1959, Serial No. 824,145

4 Claims. (Cl. 214—140)

Matter enclosed in heavy brackets [ ] appears in the original patent but forms no part of this reissue specification; matter printed in italics indicates the additions made by reissue.

This invention relates to tractor mounted loaders of the type set forth in my application Serial Number 270,118, filed February 6, 1952, and has particular reference to such a loader wherein any mechanism which might obstruct the view of the operator is moved outside of such obstructing position.

An object of the invention is to provide a new and improved material handling apparatus, such as a loader, wherein ample bucket rotation may be obtained and wherein such bucket may be hit against the lift arms of the device to knock material out of the bucket without danger of damage to the bucket or mechanism regardless of the height of the lift arms and wherein the arrangement is such as to cause minimum interference of the field of view of the operator.

Another object of the invention is to provide a material handling device of the type set forth wherein the speed of operation of the device is considerably increased while maintaining control of the device and wherein the speed of operation of the device is considerably speeded up, such as, the speed of dumping of a loader bucket while allowing the operator to maintain full control of such operation, and wherein the device is so arranged as to cause minimum interference with the view of the operator.

Another object of the invention is to provide a new and improved bucket loading arrangement for material handling apparatus which provides ample bucket rotation in both directions and with an equalizing or self-leveling arrangement for the bucket with such bucket rotation and equalizing arangement so arranged as not to interfere with the view of the operator during the operation of the device.

Other objects and advantages of the invention will be apparent from the following description taken in connection with the accompanying drawings. It will be understood that changes may be made in the details of construction and arangement of parts without departing from the spirit of the invention as set forth in the accompanying claims, as the preferred form has been given by way of illustration only.

Referring to the drawings.

Figure 2:
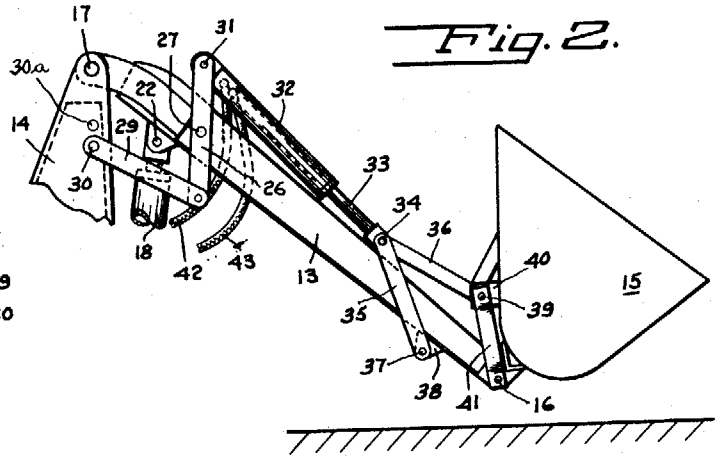
Fig. 2 is a fragmentary side view of the apparatus of Fig. 1 showing the bucket in a different position.

Referring more particularly to the drawings wherein similar reference characters designate corresponding parts throughout the several views, the loader apparatus shown embodying the invention is mounted on the tractor having the engine 10, wheels 11 and frame 12.

The apparatus is entirely hydraulically operated with the hydraulic system actuated by a hydraulic pump driven by the tractor engine.

The loader arrangement comprises a pair of lift or loader push arms 13 which are pivotally mounted at one end to the upper end of upright support 14 which is secured to the tractor frame 12.

On the forward or free ends of the arms 13 is pivotally mounted the bucket 15 at 16.

The arms 13 are pivotally mounted to supports 14 at 17 and are adapted to be raised and lowered by means of hydraulic jacks consisting of cylinders 18 which are pivotally connected at 19 to supports 20 connected to the frame 12, and rams 21 which extend into cylinders 18 and have double acting pistons within said cylinders 18 and said rams 21 are pivotally connected at their free ends at 22 to arms 13. Hydraulic fluid is supplied to cylinders 18 by hydraulic lines 23 and 24 and fluid under pressure is adapted to be supplied to said cylinders under control of one of control valves 25.

On each of the arms 13 and intermediate the ends of said arms is pivoted a lever 26 at 27. The levers 26 extend above and below arms 13 and have their lower ends pivotally connected at 28 to link 29 which in turn is pivotally connected at 30 to support 14 beneath pivot connection 17 of arms 13 and support 14.

Links 26 are pivotally connected at their upper ends at 31 to at least one extensible and contractible means such as a cylinder 32 of the bucket actuating and equalizing system and rams 33 extend into said cylinders 32 and double acting pistons thereon and said rams 33 are pivotally connected at 34 to links 35 and 36. Link 35 has its opposite end pivotally connected at 37 to lug 38 on the lower side of the arm 13 and link 36 is pivotally connected at 39 to lug 40 on bucket 15. Links 41 are provided and have their oposite ends connected to pivotal connections 16 and 39.

It will be understood that complete similar systems may be provided for each push arm although only one such system is seen from the side views of the drawings.

It will be seen from the drawings that the linkage arrangement for actuating the bucket 15 allows a much greater degree of bucket rotation while the operator maintains positive control of the bucket at all times and that with the link 35 pivotally connected to the lift arm on the lug 38 on the push or lift arm that this arrangement allows much greater bucket rotation in both directions.

Figure 1:
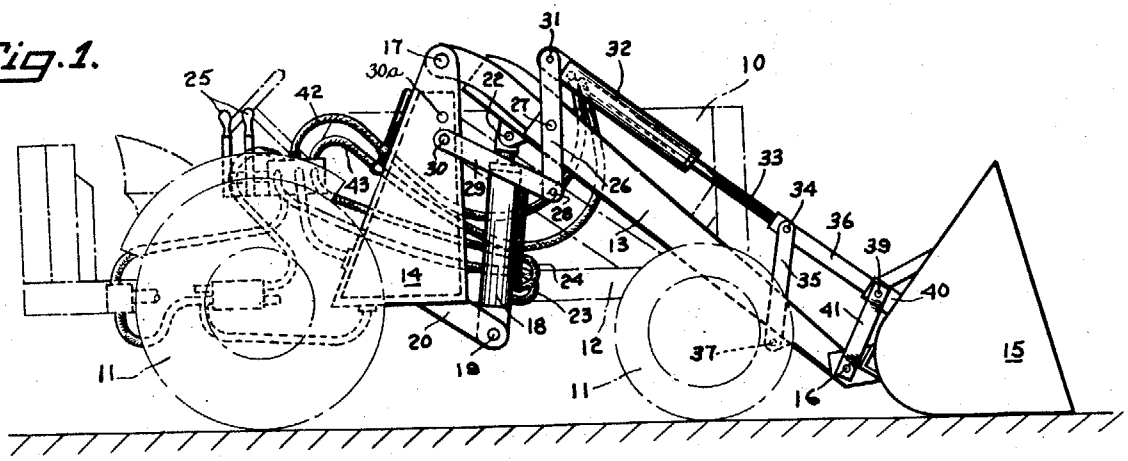
Fig. 1 is a side view of a tractor mounted loader constructed according to the invention.
Figure 4:
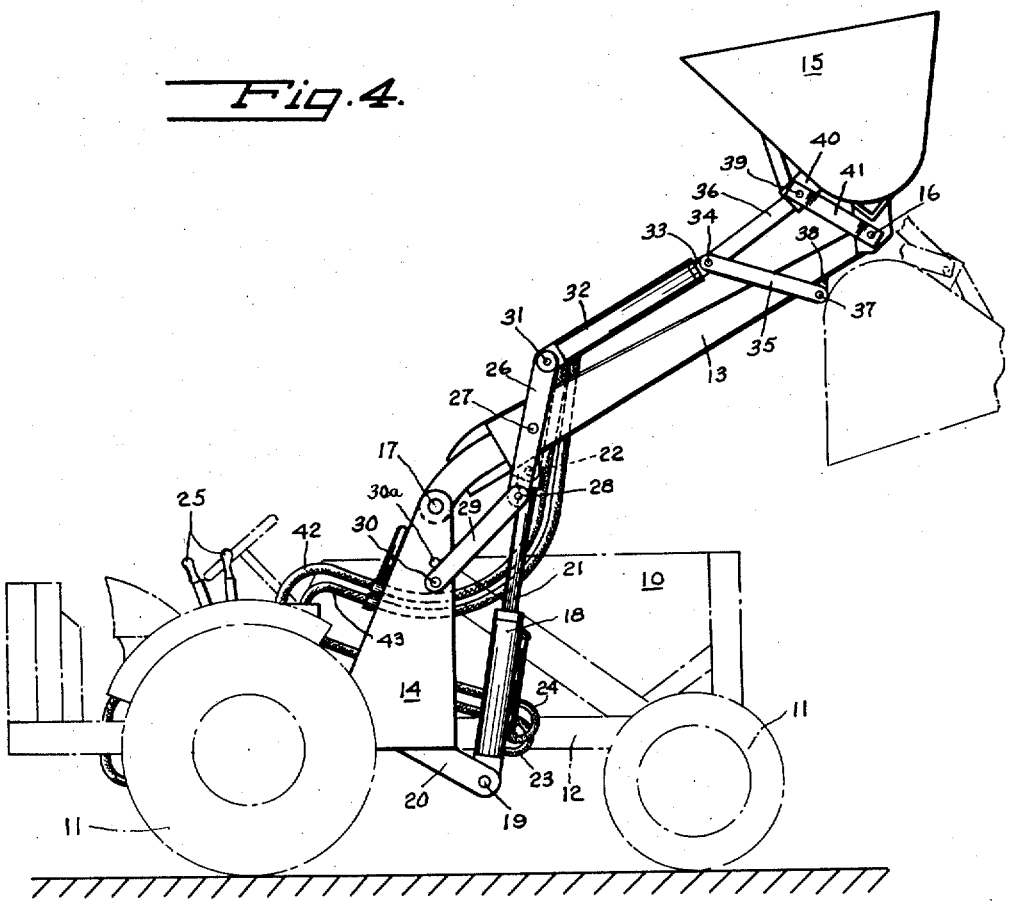
Fig. 4 is a view similar to Fig. 1 but showing the bucket in raised position.
Figure 5:
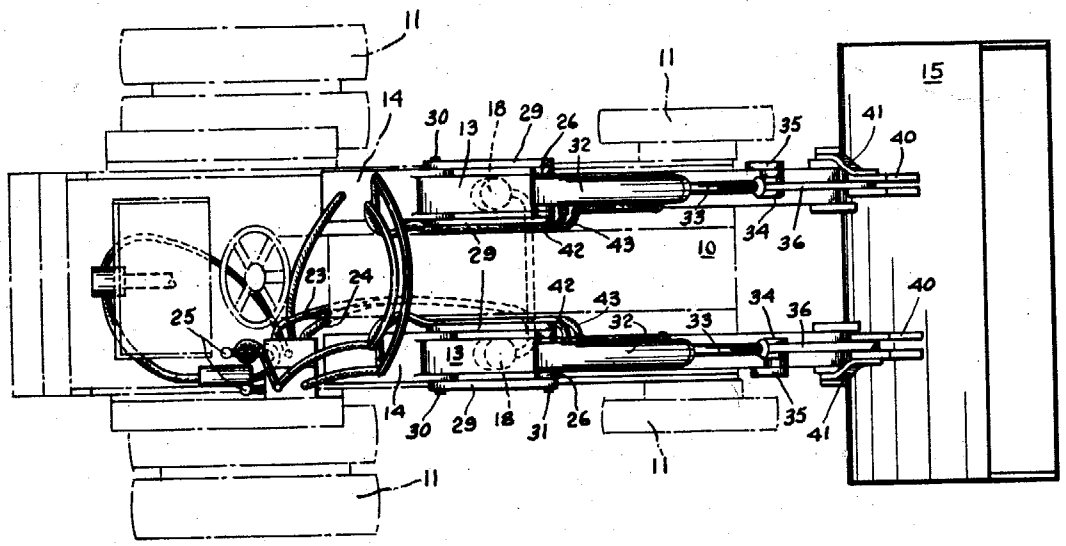
Fig. 5 is a top or plan view of the device shown in Figs. 1 and 4.

As seen in the drawings, the link 35 is so designed as to allow pivoting of the bucket from loading position as shown in Fig. 1 around the end of the push arms 13, as shown in broken lines in Fig. 4, without going over the center position and thereby allows ample bucket rotation which is essentially for dumping and, if desired, allows a hitting of the bucket against the lower side of the lift arms to knock material out of the bucket without the necessity of the arms reaching full height. Also, extension link 36, pivot link 35 and piston 33 are connected together by a simple pin or pivot connection. The links are so designed as to allow the force of the piston to follow substantially the arc of travel of the bucket in nearly a direct plane thus providing a maximum degree of rotation of the bucket with a minimum amount of piston travel.

Due to the arrangement of this linkage, maximum power is obtained with the bucket in digging position and the speed of rotation of the bucket is greatly increased as the bucket is rotated to dumping position.

The self-leveling links 29 provide a simpler and better means of leveling of the bucket and allow their positioning in a plane beneath arms 13 and, therefore, out of the field of view or vision of the operator while providing leveling of the bucket during the lifting thereof due to the arangement of links 29 and levers 26 with cylinders 32 and the self-leveling links are so designed as to provide bucket leveling at all positions without restricting the degree of bucket rotation.

The cylinder 32 is adapted to receive fluid from the lines 42 and 43 under the control of one of the control valves 25.

Figure 3:
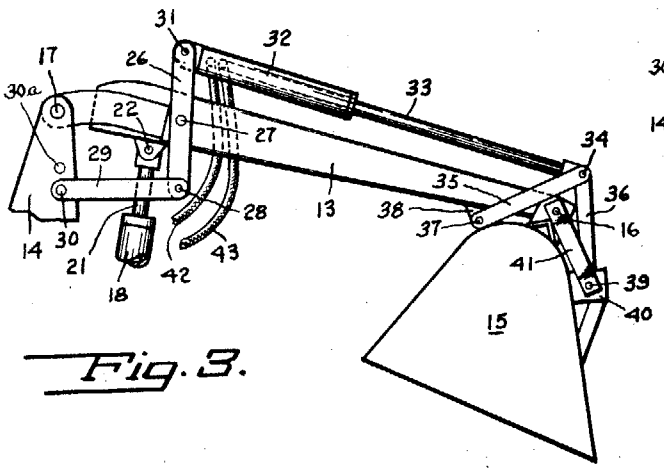
Fig. 3 is a view similar to Fig. 2 but showing the bucket in still another position.

It will be seen from the foregoing that with the arrangement shown and described, full bucket rotation upwardly from the loading position shown in Fig. 1 through a "break out" position to a full load retention position as seen in Fig. 2 as well as downwardly to the dumping position shown in Fig. 3 and leveling can be obtained as set forth in said application Serial No. 270,118 with the self-leveling links in a plane beneath the lift arms and, therefore, out of such position as might obstruct the view of the operator.

It will be seen that as the push arms 13 are raised, the links 26 and 29 are pivoted with the upper end of lever 26 pivoting forward and thus there is maintained a constant and level position of the bucket. This arrangement provides bucket rotation and equalization or leveling of the bucket in a simple and very economical, yet rugged construction.

It is pointed out that by changing the hitch point 30 of link 29 on support 14, as for example to point 30a, that the degree of self-leveling can be varied, if desired.

From the foregoing it will be seen that I have provided new and improved means for obtaining all of the objects and advantages of the invention.

I claim:

1. In a device of the character described, a pair of spaced supports, a push arm pivotally connected to each of said supports, a bucket pivotally mounted relative to said push arms and means for pivoting said bucket relative to said push arms for actuating said bucket and for leveling said bucket upon the raising thereof by said push arms, said means comprising hydraulic means above the plane of said push arms, said hydraulic means being connected to said bucket, lever means pivotally connected adjacent one end to said hydraulic means and intermediate their ends to said push arms at the mid point of said levers and link means pivotally connected to said lever means and to said support at a point substantially vertically beneath the connection of said push arms to said support.

2. In a device of the character described, a pair of spaced supports, a push arm pivotally connected to each of said supports, a bucket pivotally mounted relative to said push arms and means for pivoting said bucket relative to said push arms for actuating said bucket and for leveling said bucket upon the raising thereof by said push arms, said means comprising hydraulic means above the plane of said push arms, said hydraulic means being connected to said bucket, lever means pivotally connected *adjacent one end thereof* to said hydraulic means and *intermediate their ends* to said push arms, *said lever means extending above and below said push arms,* and link means connected to said *lever means* [support] and to said *supports* [lever means] at *points* [a point vertically] beneath the connection of said push arms to said supports.

3. In a device of the character described, a pair of spaced supports, a push arm pivotally connected to each of said supports, a bucket pivotally mounted relative to said push arms and means for pivoting said bucket relative to said push arms for actuating said bucket and for leveling said bucket upon the raising thereof by said push arms, said means comprising hydraulic means above the plane of said push arms, said hydraulic means being connected to said bucket, lever means pivotally connected adjacent one end to said hydraulic means and intermediate their ends to said push arms and link means pivotally connected to said lever means and to said support at points substantially vertically beneath the connection of said push arms to said supports.

4. In a device of the character described, a pair of spaced supports, a push arm pivotally connected to each of said supports, means to raise or lower said push arms by pivotal movement on said supports, a bucket pivotally mounted relative to said push arms, and extensible and contractible means for pivoting said bucket on said arms, said bucket being pivotable by said extensible and contractible means from a scooping position with the lower front edge of the bucket extending forwardly and generally horizontally from the push arms, upwardly through a break out position with the lower front edge of the bucket raised slightly, to a full load retention position with the mouth of the bucket turned upwardly, means for leveling said bucket as it is raised or lowered as said push arms are raised or lowered, said leveling means comprising a lever on each said push arm pivoted thereto at its mid point, a link pivotally secured to one end of each said lever at its lower end and to the corresponding support below the pivotal connection of said push arms to said support, said link and lever being so proportioned that for all positions of said push arms as they are raised or lowered said link remains substantially vertical, said extensible means being pivotally secured to the top ends of said levers whereby upon extension of said extensible means said bucket may be rotated from full load retention position downwardly past the break out and past the scooping position to a dumping position regardless of the level of the push arms.

References Cited in the file of this patent or the original patent

UNITED STATES PATENTS

| | | |
|---|---|---|
| 2,455,474 | Drott et al. | Dec. 7, 1948 |
| 2,590,454 | Pilch | Mar. 25, 1952 |
| 2,645,369 | Allan | July 14, 1953 |
| 2,711,257 | Apel | June 21, 1955 |

FOREIGN PATENTS

| | | |
|---|---|---|
| 1,072,530 | France | Mar. 17, 1954 |